Nov. 8, 1966     C. DOMENIGHETTI     3,283,678
METHOD FOR PREVENTING THE TRANSMISSION OF VIBRATIONS
IN THE DIFFERENT COMPONENTS OF A MACHINE
Filed Sept. 10, 1958

United States Patent Office 3,283,678
Patented Nov. 8, 1966

3,283,678
METHOD FOR PREVENTING THE TRANSMISSION OF VIBRATIONS IN THE DIFFERENT COMPONENTS OF A MACHINE
Costante Domenighetti, Via Nosetto 6,
Bellinzona, Switzerland
Filed Sept. 10, 1958, Ser. No. 760,102
Claims priority, application Switzerland, Sept. 13, 1957, 50,517
4 Claims. (Cl. 94—50)

This invention relates to methods and associated devices for preventing the transmission of vibrations from any component of a machine to adjacent components, and in particular for preventing the transmission of vibrations from the shaft of a vibrator, to the support or frame thereof.

More precisely the invention provides a method and device to keep the frame of a road roller of the vibrating type, free from the vibrations as generated by the shaft of vibrating roll.

Said method is characterized in that a fluid cushion, preferably kept under an adjustable pressure, is interposed between the vibrating component of a machine, and the components thereof which are to be kept free from vibrations.

The device by which the above-stated method is carried into practice, is characterized by a fluid cushion, contained in a flexible casing, provided with a pressure adjustment valve, and shaped in such a manner as to cover the whole supporting surface between the vibrating component and the component which is to be kept free from vibrations.

In practice, since it is important to keep the frame of a road roller of the vibrating type free from vibrations which could be transmitted thereto by the shaft whereon the vibrating roll is fitted, the device is realized in the form of a metal annular disk, secured at its bore to the vibrating shaft and having a pneumatic ring, provided with a pressure regulating valve, secured to its peripheral crown.

Two embodiments of the invention are diagrammatically shown in the accompanying drawing wherein.

Figure 1:
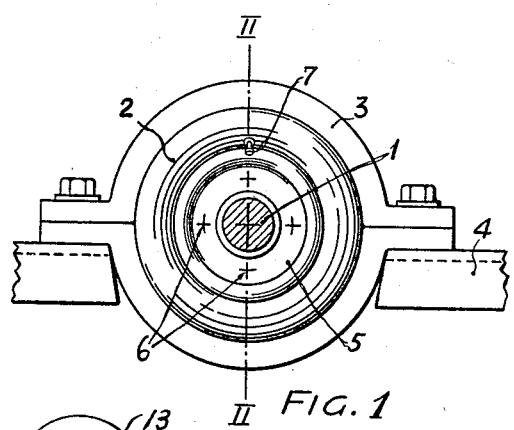
FIG. 1 is a front view of a vibrating shaft mounted on a support by a damping cushion provided in accordance with the invention.

As shown in the drawing, the frame 4 is supported on the vibrating shaft 1 by means of an annular disk 5, secured at its bore to the shaft 1 with the aid of a connecting device 6, and fitted with a pneumatic cushion 2, secured to its outer periphery, and provided with a valve 7 for the adjustment of inside pressure. The contact between said cushion and the frame 4 is established through a semi-circular shaped case 3, a portion of said pneumatic cushion being seated in the concave seat 3¹ of said case.

Now, by suitably adjusting, with the aid of valve 7, the pressure of pneumatic cushion 2, within which the compressed fluid (preferably air) is enclosed in a flexible hose or tube 8 having a uniform wall thickness, the possibility is given to obtain a thoroughly uniform vibration damping in the whole machine, even in the case that more than two dampers are fitted on the vibrating shaft 1. Tube 8 constitutes a toroidal elastic hollow ring.

Figure 2:
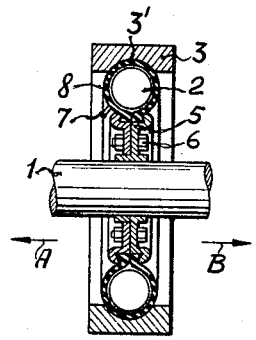
FIG. 2 is a cross-sectional view taken along line II—II of FIG. 1 with the exception of said shaft.

A variable depth could be featured in the circular groove 3' of case 3; moreover, said case might be formed with side walls, designed to resist axial stresses, exerted in the direction of arrows A and B in the FIG. 2.

Figure 3:
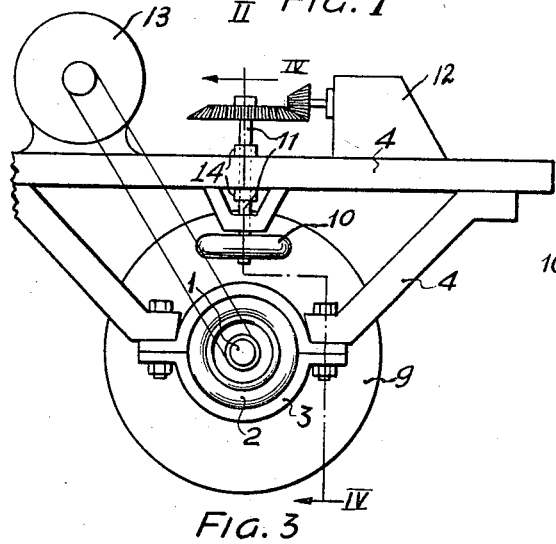
FIG. 3 is a side view of the roll of a vibrating road roller, provided with an auxiliary device for taking-up the axial stresses, while damping at the same time the vibrations.
Figure 4:
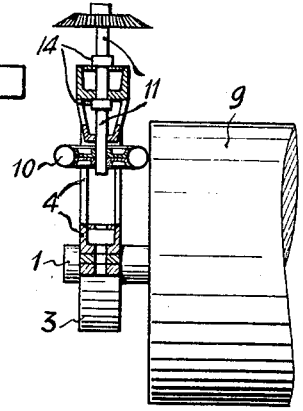
FIG. 4 is a front view of the arrangement as shown in FIG. 3, with a sectional view of the auxiliary device.

When the extensions or shoulders as formed on the toroidal case, or on pneumatic cushion, are not sufficient to prevent positively any axial displacement, then recourse can be made to an auxiliary device, as shown in FIGS. 3 and 4. Such device is designed, above all, to have the pneumatic cushion 2 relieved from any possible stress in a direction parallel to its axis.

Said auxiliary device, might be fitted on either, or on both sides of vibrating roll 9, which is mounted on the vibrating shaft 1, the auxiliary device essentially comprises a further pneumatic cushion 10, also of annular shape, and fitted to frame 4 of the machine. Said pneumatic cushion 10 will damp also the vibrations in a transverse direction, which are produced in the roll 9 by the eccentric fitted on the shaft 1. In case the vibrating roll 9, with its shaft 1, which is subjected to strong and quick vibrations, is to be connected with a frame, then the radial oscillations are damped in respect to frame 4, by the device as shown in the FIGS. 1 and 2, while the vibrations possibly produced in a direction parallel to shaft 1, as well as all lateral shiftings, caused while moving around a curve, or by the bad surface of road whereon the machine rests, will be taken-up and damped by the pneumatic cushions 10, as fitted on a shaft 11 perpendicular to roll shaft 1, and resting against the side faces of roll 9, or against any other suitable place. Such preferably annular shaped cushions 10, are fitted loosely on their shafts, and will rotate at the same peripheral speed of the side faces of roll 9, against which they rest. The cushions 10, instead of being loosely fitted, might be driven by any known mechanical systems, such as motor 12 through suitable gearing thereby driving the vibrating roll 9. Thus, cushions 10 might act at the same time both as driving, and as damping elements. The shaft 11 can be displaced along its axis within bearings 14 to adjust the position of the cushion 10 with respect to roll 9.

The disk 5 could be rigidly secured to shaft 1 if no rotary motion is to be imparted to the shaft. If instead a rotary shaft is used, said disk is fitted thereon by means of a suitable bearing.

Obviously, the inventive idea might be carried into practice also in a reversed manner, i.e. on machines wherein the compressed air cushions with adjustable pressure are designed to keep a shaft free from the vibrations transmitted by a vibrating frame connected therewith.

What I claim is:

1. A device for connecting a vibrating member and an associated member, said device comprising a toroidal pneumatic ring having inner and outer peripheries and adapted for housing a pressure medium, a first rigid element engaging the inner periphery of said ring and including two disc portions in face to face relation, a second rigid element engaging the outer periphery of said ring and including two semi-circular sections cooperatively encircling said ring, said rigid elements being concentric and sandwiching said ring therebetween, means connecting said semi-circular sections to adjust the relationship of the same in accordance with the pressure of said medium in said ring, one of said elements being supported on the vibrating member and the other element being supported on said associated member, a second pneumatic ring, means supporting said second ring on said associated member for displacement along and rotation around an axis perpendicular to the axis of the first said ring, said second ring engaging said vibartory member and resisting displacement of the same in an axial direction relative to said first ring, and a motor coupled to and driving said second ring.

2. Apparatus comprising a freely vibratable roller, a shaft supporting said roller and adapted to vibrate therewith, two parallel annular discs in face to face relation supported in concentric relation on said shaft, said discs including peripheral flanges in facing relationship and each defining a groove, a flexible toroidal pneumatic ring, said ring having annular edges in spaced relation, said annular edges being supported in the grooves defined by the peripheral flanges in sealing relation to define a fluid tight chamber in said ring, means detachably coupling said annular discs together, two rigid semi-circular members cooperatively arranged to encircle said ring, lugs on said members, a frame, means adjustably connecting said lugs together and to said frame, each said member being provided with a concave seat conforming to the shape of the ring, said ring being supported in each said seat such that said semi-circular portions prevent lateral movement of the ring while the ring damps substantially all vibration of said roller, said apparatus further comprising a second pneumatic ring supported on said frame for rotation about an axis extending perpendicular to the shaft, said second ring being in lateral engagement with the roller to resiliently and dampingly prevent lateral displacement thereof.

3. Apparatus as claimed in claim 2 comprising a motor rotating said second ring about the axis thereof and for driving the roller.

4. Apparatus as claimed in claim 3 comprising means supporting said second ring for sliding adjustment along said axis.

References Cited by the Examiner

UNITED STATES PATENTS

| | | | |
|---|---|---|---|
| 1,431,099 | 10/1922 | Dann | 94—50 X |
| 1,439,617 | 12/1922 | Dobbins et al. | 267—65 |
| 2,000,196 | 5/1935 | Simmons | 267—35 |
| 2,027,540 | 1/1936 | Lewis | 180—22 X |
| 2,081,996 | 6/1937 | Hacker | 267—35 |
| 2,155,919 | 4/1939 | Wooler et al. | 308—184 |
| 2,160,462 | 5/1939 | Schieferstein | 94—48 |
| 2,259,942 | 10/1941 | Stroud | 308—184 |
| 2,386,946 | 10/1945 | Greiner et al. | 94—50 X |
| 2,671,386 | 3/1954 | Kerridge | 94—50 |
| 2,677,995 | 5/1954 | Wood | 94—48 |
| 2,704,968 | 3/1955 | Paramythioti | 94—50 |
| 2,778,181 | 1/1957 | Gray | 94—50 |
| 2,812,696 | 11/1957 | Henry | 94—48 |

FOREIGN PATENTS

| | | |
|---|---|---|
| 143,961 | 10/1951 | Australia. |
| 1,101,776 | 4/1955 | France. |
| 715,671 | 1/1942 | Germany. |
| 700,735 | 12/1953 | Great Britain. |

CHARLES E. O'CONNELL, *Primary Examiner.*

JACOB L. NACKENOFF, WILLIAM I. MUSHAKE, *Examiners.*

L. T. CARTER, N. C. BYERS, *Assistant Examiners.*